Nov. 22, 1960

D. S. REYNOLDS ET AL 2,961,127

SELECTIVE BEVERAGE DISPENSER

Filed March 26, 1956

Inventors
Donald S. Reynolds
Robert J. Thorn by Lloyd J. Andres

Nov. 22, 1960   D. S. REYNOLDS ET AL   2,961,127
SELECTIVE BEVERAGE DISPENSER
Filed March 26, 1956   2 Sheets-Sheet 2

Inventors
Donald S. Reynolds
Robert J. Thorn
by
Lloyd H. Fulcher

United States Patent Office 2,961,127
Patented Nov. 22, 1960

2,961,127

SELECTIVE BEVERAGE DISPENSER

Donald S. Reynolds and Robert J. Thorn, Chicago, Ill., assignors to Automatic Canteen Company of America, Chicago, Ill., a corporation of Delaware Filed Mar. 26, 1956, Ser. No. 573,824

3 Claims. (Cl. 222—70)

This invention relates in general to automatic beverage dispensing machine and more particularly to a machine for selectively vending a plurality of beverages of different flavor including a preselective adjustment for automatically delivering any one of a predetermined number of beverages having a predetermined degree of carbonation.

The present invention and beverage dispensing machines prior to this invention utilize a construction to blend various flavor syrups with sweet water or carbonated water into a disposable cup. However, the machines prior to this invention incorporated fixed means for providing a selection of carbonated beverages and non-carbonated beverages.

It has been found to be highly desirable to produce automatically a flavor beverage with different degrees of carbonated water blended with sweet water and the construction of the present invention hereinafter described illustrates means whereby preselection of each of the selected beverages may be delivered with any degree of carbonation from zero carbonation to maximum carbonation which is the principal object attained.

A further object of the invention is the provision of an electro-hydraulic system in a beverage dispensing machine whereby the degree of carbonation of any of the selected beverages may be easily varied and a further electric switching means whereby a simple manual adjustment will condition said machine to selectively deliver beverages of the non-carbonated variety or having predetermined degrees of carbonation.

Another object of the invention is the provision of an automatic electric circuit for selectively controlling the hydraulic system in a beverage vending machine for the selective delivery of a predetermined number of precisely metered beverages having predetermined degrees of carbonation.

These and other objects and advantages in one embodiment of the invention are described and shown in the following specification and drawings in which Fig. 1 is a diagrammatic showing of the water system in the beverage dispensing machine;

The principal components on machine herein described are used in connection with other well-known components usually contained in one cabinet. Therefore, such units as refrigeration and coin control and signal circuits are omitted for the purpose of clarity.

Figure 1:
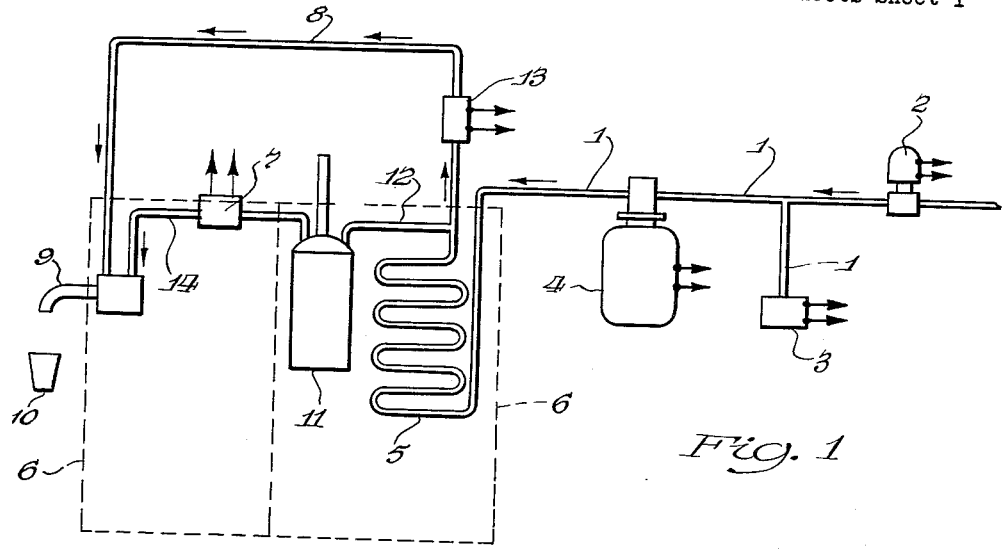

Referring to Fig. 1, conduit 1 is connected to a source of fresh water supplied at normal domestic pressure. An electric valve 2 is used to control the inlet flow of water and a pressure switch 3 is employed to electrically disconnect the mechanism in the event of a water failure. An electric pump 4 is provided to supply water at a pre-determined pressure to the dispensing apparatus hereinafter described when energized. A cooling coil 5 positioned in a cooling compartment 6 has its outlet connected to a fresh water electric valve 13. The outlet of said valve is connected by conduit 8 to a dispensing faucet 9 positioned over a cup station illustrated by cup 10.

Fresh water is also supplied to a carbonator 11 through conduit 12 and normally maintained to a pre-determined level by a liquid level control not shown. The water in the carbonator is supplied with carbon dioxide gas, by well known means not shown. The outlet of the carbonator is adapted to supply carbonated water to the input of the carbonator electric valve 7. The outlet of said valve is connected by conduit 14 to faucet 9.

Therefore, when under operating conditions and water pump 4 is energized, either carbonated water or fresh water or mixtures of both will be supplied to the cup station, depending upon the particular operation of valves 7 and 13 to be hereinafter described.

Figure 2:
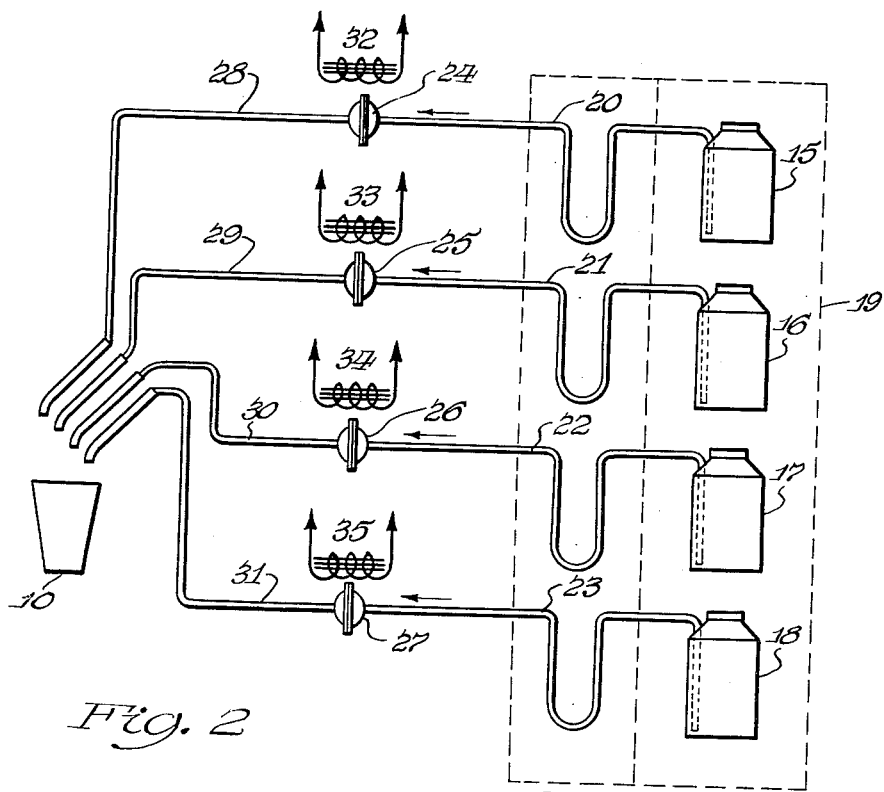
Fig. 2 is a diagrammatic showing of the flavor syrup system in the machine.

Fig. 2 illustrates the flavor syrup system in which four containers 15—16—17—18 are shown positioned in a refrigerated compartment 19. Delivery conduits 20—21—22—23 from each container pass through said cooling compartment and connect to corresponding positive displacement syrup pumps 24—25—26—27. The outlet of each syrup pump is connected through conduits 28—29—30—31 to individual faucets for delivery of syrup to cup station 10 as shown.

Each pump will deliver a pre-determined volume of flavor syrup by electromagnetic means 32—33—34—35 when selectively energized.

Figure 3:
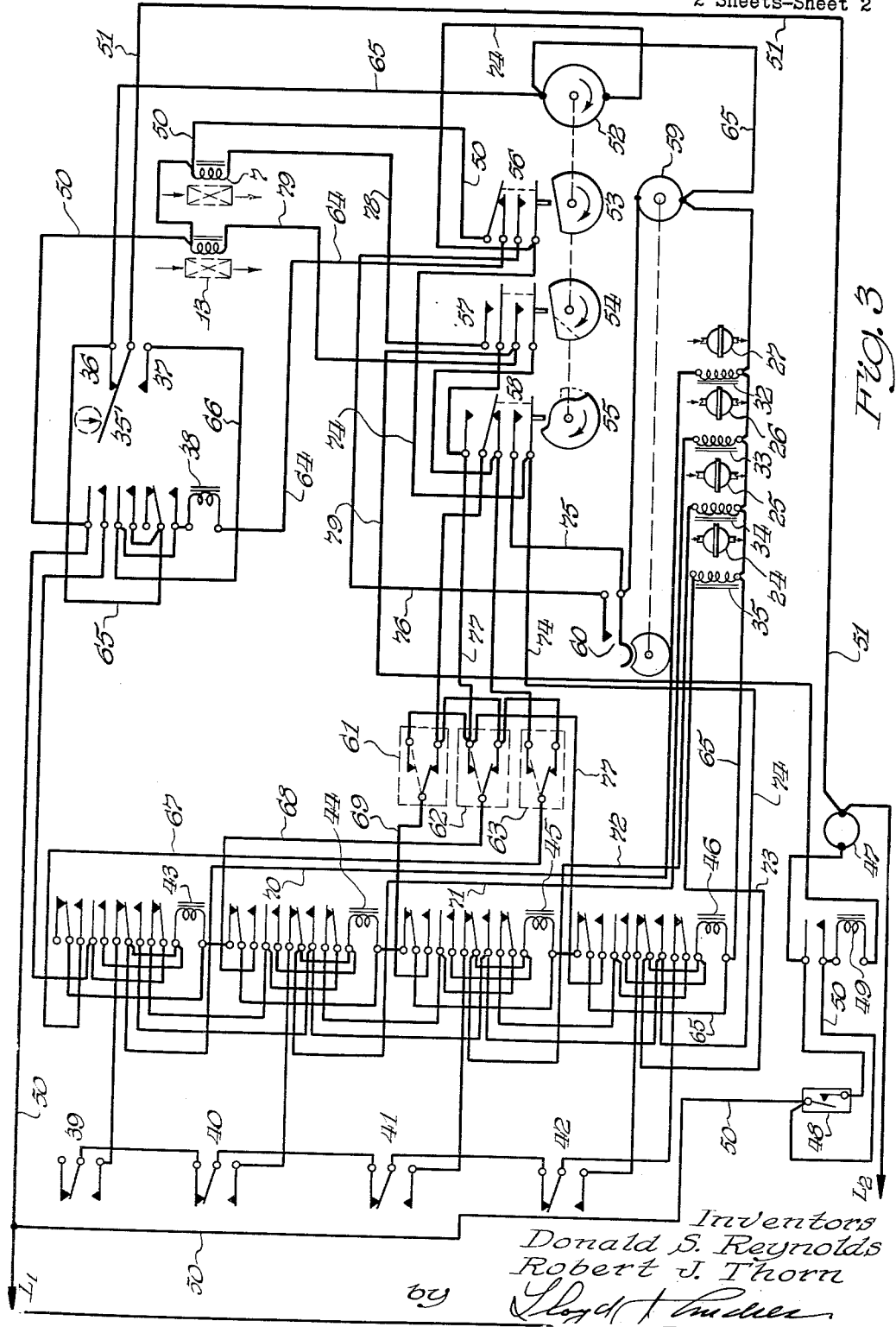
Fig. 3 is a schematic diagram of the electric control elements in the machine.

Fig. 3 illustrates the control system shown as related to selective operation upon the deposit of a pre-determined coin.

Although the system described may be used with a wide variety of flavor selections, this description is limited to the use of four different flavor syrups. A conventional coin switch 35' having blades 36 and 37 is adapted to operate a so-called set-up relay 38 following the deposit of each coin. Flavor selector switches 39—40—41—42 are connected to corresponding relays 43—44—45—46 as shown.

Power is supplied to the circuit through terminals L-1 and L-2. The electric water pump 47 is controlled by carbonator level control switch 48 or relay 49. Hence, when the water pump 47 is energized, fresh water under pre-determined pressure will be supplied to the water circuit shown in Fig. 1. Main conductors 50 and 51 supply electric power to the entire system. A timer motor 52 is adapted to rotate cams 53—54—55 for one cycle or one revolution when the motor is momentarily energized. Cam 53 operates a switch combination 56 which controls the motor 52 and the timing interval of the circuit. Cam 54 operates switch combination 57 for controlling the time interval of energization of valves 7 and 13 and hence the time interval of the discharge of fresh water and cam 55 operates switch combination 58 for controlling the discharge of carbonated water.

Motor 59 under control of switch 60 motivates the positive displacement syrup pumps 24—25—26—27 when selectively energized by electromagnets 32—33—34—35.

Fresh water valve 7 and the carbonated water valve 13 shown in Fig. 1 are responsive to the adjustable cams 54 and 55, respectively.

Selector switch 42 is arranged in this circuit to operate syrup pump 24, which syrup will be mixed with carbonated water only. The remainder of the syrup pumps 25—26—27 are under the control of three switches 61—62—63, which switches through a circuit from relays 43—44—45 cooperating with cam switches 57 and 58 will selectively determine whether or not fresh water, carbonated water or a mixture of both will be delivered with corresponding selected syrups dependent upon the preadjustment of cams 54 and 55.

Conductor 50 supplies a circuit to the set-up relay 38 and to valves 7 and 13 and to the normally closed switch 56 which is under the control of cam 53. Conductor 64 connected to the normally closed switch 56 is connected to one side of relay 38. A conductor 65 connected to relay 38 supplies one side of a circuit to coin switch 35′, motor 52, motor 59, electromagnets 32—33—34—35, and to one side of relays 46—45—44—43 when relay 38 is momentarily energized. The deposit of a coin will move coin switch blade 35 into momentary contact with blade 37 and through conductor 66 momentarily energized relay 38, which will be self-locking by means of a pair of conventional holding contacts. A conductor 67 connects an operating contact of relay 43 to switch 63. Conductor 68 connects an operating contact from relay 44 to switch 62 and conductor 69 connects an operating contact of relay 45 with switch 61. Thus, when each of the selector switches 39—40—41 are selectively operated, their corresponding self holding relays 43—44—45 will complete a circuit to switches 61—62—63, similarly, conductor 70 connected to an operating contact of relay 43 completes a circuit to electromagnet 32 for operating syrup pump 27. Conductor 71 connected to relay 44 completes a circuit to electromagnet 33 for operating syrup pump 26. Conductor 72 connected to an operating contact of relay 45 completes a circuit to electromagnet 34 for operating syrup pump 25. Conductor 73 connected to an operating contact of relay 46 completes a circuit to electromagnet 35 for operating syrup pump 24.

When each of the relays 43—44—45—46 are selectively energized, a circuit will be completed through conductor 74 to switch 58 and switch 56 and timer motor 52. Thus, the timer motor will be energized for one cycle of operation. One of the switches 58 through conductor 75 will energize the syrup motor 59, which will also operate for one cycle of operation by virtue of switch 60 and conductor 76. It is seen that during the cycle of the syrup motor 59 the selected energized syrup electromagnet will discharge a pre-selected volume of syrup into the cup station shown in Fig. 2. In the event selector switch 42 is operated, which will energize relay 46 and simultaneous with the operation of syrup pump 24 and by virtue of conductor 77 and switch 57 through conductor 78, electric valve 7 will be energized to discharge a pre-determined quantity of carbonated water with the afore-mentioned syrup into the cup station. When the switches 61 and 62 are in the position shown in dotted lines, each cycle of the timer will operate valve 7 to discharge carbonated water for mixture with the selected flavor syrup. When switch 63 is in the position shown in dotted lines and selector switch 39 has been closed, each cycle of the timer will operate fresh water valve 13 and water pump 47 by energizing relay 49 and thereby closing the relay switch—both circuits being completed upon closing of the lower switch of switch combination 57. When the switches are thrown in their opposite positions as shown by solid lines, then selection made by switches 40 and 41 will operate first the carbonated water electric valve by virtue of conductor 78 to mix carbonated water with the flavor syrups.

It is now apparent that because of the adjustable nature of cams 54 and 55, that a mixture of both carbonated water and fresh water will be released by virtue of the overlapping action of valves 7 and 13. This is achieved by throwing any one of or all of switches 61—62—63 to the positions shown in solid lines. When the upper switch of switch combination 58 is in contact with its upper contact by virtue of the action of cam 55, carbonated water is first dispensed by energizing valve 7 by a circuit through conductor 78, the upper switch of switch combination 57 closed by the action of cam 54, and the closed upper switch of switch combination 58. When the last-mentioned switch is released and returns to the position shown in the drawing, the circuit of carbonated water valve 7 is opened, and dispensing of carbonated water is terminated. Then, if the action of cam 54 overlaps that of cam 53, the circuit for valve 13 and water pump 47 is closed by return of the upper switch of switch combination 58 to its home position—the lower switch of switch combination 57 being closed by virtue of the overlapping action of cam 54. Thus, fresh water is also dispensed into the receiving cup for an interval dependent upon the overlapping of the cams. Therefore, each of the three selective drinks corresponding to switches 61—62—63 may result in pre-set degrees of a mixture of carbonated water and fresh water.

It will be seen from the foregoing description that cam 54 and its associated combination switch 57 controls for a predetermined time interval the energization of valves 7 and 13 and thus provides an equal discharge interval in all cases—whether the selected circuit is one in which all fresh water is dispensed, one in which all carbonated water is dispensed, or one in which the valves 7 and 13 are sequently operated and portions of both fresh water and carbonated water are dispensed. In all cases, there is dispensed due to this common control a substantially equal volume of uncarbonated water, highly carbonated water, or mildly carbonated water—the degree of carbonation in the latter instance dependent upon the degree of overlapping of cams 54 and 55.

Upon the completion of a cycle of the timer cam 53 will momentarily open a switch 56 and restore relay 38 and any relay of the group 43—44—45—46 that may have been selectively energized, thus returning all components to their normal inoperative position.

Having described our invention, we claim:

1. In a beverage dispensing machine, the combination comprising means for supplying non-carbonated water, a source of pressurized carbonated water, a non-carbonated water-dispensing conduit connected with said means and containing a normally-closed, electrically-operated valve, a carbonated water-dispensing conduit connected with said source and containing a normally-closed, electrically-operated valve, and dispensing-cycle-control circuit means including a manually-operated switch having two contact positions, a circuit for electrically energizing said electrically-operated valve in said non-carbonated water-dispensing conduit, a second circuit for electrically energizing said electrically-operated valve in said carbonated water-dispensing conduit, one of said circuits including one of the contact positions of said manually-operated switch, a normally open control switch in each of said circuits, means for simultaneously closing said control switches for a predetermined, equal period of time, a circuit including the other contact position of said manually-operated switch and also including switch means operable during said period of time and electrically connected with said electrically-operated valves through their respective control switch for closing the circuit through first one and then the other of said control switches while they are closed during said predetermined period for dispensing during said period of time both carbonated and non-carbonated water in sequential order, and a drink selector switch electrically connected with said circuits through said manually-operated switch, whereby the position of said manually-operated switch determines the type of water dispensed for the selected drink.

2. In a beverage dispensing machine, the combination comprising means for supplying non-carbonated water, a source of pressurized carbonated water, a non-carbonated water-dispensing conduit connected with said means and containing a normally-closed, electrically-operated valve, a carbonated water-dispensing conduit connected with said source and containing a normally-closed, electrically-operated valve, and dispensing-cycle-control circuit means including a first manually-operated switch and a second manually-operated switch, each switch having two contact positions, a first circuit for electrically energizing said electrically-operated valve in said non-carbonated water-dispensing conduit, said first circuit including one contact position of said first switch, a second circuit for electrically energizing said electrically-operated valve in said carbonated water-dispensing conduit, said second circuit including one contact position of said second switch, a normally open control switch in each of said first and second circuits, means for simultaneously closing said control switches for a predetermined, equal period of time, a third circuit with the other contact positions of said first and second manually-operated switches connected in parallel therein, said third circuit including switch means operable during said period of time and electrically connected with said electrically-operated valves through their respective control switches for closing the third circuit through first one of said control switches and then the other of said control switches while they are closed during said predetermined period of time for dispensing during said predetermined period of time both carbonated and non-carbonated water in sequential order, a first drink selector switch electrically connected with said first circuit and said third circuit through said first manually-operated switch, and a second drink selector switch electrically connected with said second circuit and said third circuit through said second manually-operated switch whereby said machine can dispense drinks wherein the diluting liquid is entirely carbonated water, entirely non-carbonated water, or mixtures of carbonated and non-carbonated water in correspondence to the settings of said manually-operated switches.

3. The combination of claim 1 wherein said switch means comprises a cam-actuated switch and a first cam operatively associated with said cam-actuated switch, said means for simultaneously closing said control switches comprising a second cam operatively associated with said control switches, said first and second cams being mounted on a rotatable, common shaft, and said shaft being driven by an electric motor having means operatively associated therewith to energize said motor and then deenergize said motor after one revolution thereof.

References Cited in the file of this patent

UNITED STATES PATENTS

| | | |
|---|---|---|
| 1,954,261 | Pierce | Apr. 10, 1934 |
| 2,261,338 | Carlson | Nov. 4, 1941 |
| 2,376,403 | Thompson et al. | May 22, 1945 |
| 2,462,019 | Bowman | Feb. 15, 1949 |
| 2,612,304 | Nissen | Sept. 30, 1952 |
| 2,657,628 | Von Stoeser | Nov. 3, 1953 |
| 2,712,887 | King | July 12, 1955 |
| 2,776,074 | Laurence | Jan. 1, 1957 |
| 2,828,889 | Joschko | Apr. 1, 1958 |